United States Patent
Song et al.

(10) Patent No.: US 9,235,903 B2
(45) Date of Patent: Jan. 12, 2016

(54) IMAGE PROCESSING SYSTEM WITH AUTOMATIC SEGMENTATION AND METHOD OF OPERATION THEREOF

(71) Applicant: Sony Corporation, Tokyo (JP)

(72) Inventors: Bi Song, San Jose, CA (US); Ming-Chang Liu, San Jose, CA (US)

(73) Assignee: Sony Corporation, Tokyo (JP)

( * ) Notice: Subject to any disclaimer, the term of this patent is extended or adjusted under 35 U.S.C. 154(b) by 12 days.

(21) Appl. No.: 14/244,470

(22) Filed: Apr. 3, 2014

(65) Prior Publication Data

US 2015/0287210 A1 Oct. 8, 2015

(51) Int. Cl.
  *G06K 9/34* (2006.01)
  *G06K 9/36* (2006.01)
  *G06T 7/00* (2006.01)
  *G06T 11/60* (2006.01)

(52) U.S. Cl.
  CPC ........... *G06T 7/0081* (2013.01); *G06K 9/34* (2013.01); *G06T 7/0083* (2013.01); *G06T 11/60* (2013.01); *G06T 2207/20141* (2013.01); *G06T 2207/20148* (2013.01); *G06T 2207/20152* (2013.01)

(58) Field of Classification Search
  USPC ................................................ 382/173, 284
  See application file for complete search history.

(56) References Cited

U.S. PATENT DOCUMENTS

| 6,075,875 | A * | 6/2000 | Gu ..................... G06T 7/0081 375/E7.04 |
| 6,975,875 | B2 * | 12/2005 | Lee et al. .................. 455/458 |
| 7,366,348 | B2 | 4/2008 | Watson |
| 7,873,214 | B2 * | 1/2011 | Shaw et al. ................. 382/173 |
| 8,260,048 | B2 | 9/2012 | Jin |
| 2004/0258305 | A1 * | 12/2004 | Burnham et al. ............ 382/171 |
| 2005/0129312 | A1 * | 6/2005 | Ernst et al. ................. 382/173 |
| 2009/0238457 | A1 | 9/2009 | Rittscher et al. |
| 2010/0066761 | A1 | 3/2010 | Tousch et al. |
| 2011/0075927 | A1 * | 3/2011 | Xu .................... G06K 9/6224 382/173 |
| 2013/0094750 | A1 | 4/2013 | Tasdizen et al. |

FOREIGN PATENT DOCUMENTS

EP 0483299 B1 5/1992

OTHER PUBLICATIONS

Haris et al., "Hybrid Image Segmentation Using Watersheds and Fast Region Merging", "IEEE Transactions on Image Processing", Dec. 1998, pp. 1684-1699, vol. 7, No. 12, IEEE.
Salman, "Image Segmentation Based on Watershed and Edge Detection Techniques", "The International Arab Journal of Information Technology", Apr. 2006, pp. 104-110, vol. 3, No. 2.

* cited by examiner

*Primary Examiner* — Kanjibhai Patel
(74) *Attorney, Agent, or Firm* — Ishimaru & Associates LLP (57) ABSTRACT

An image processing system and method of operation includes: a source image having source pixels; a homogeneity image module for forming a homogeneity image having homogeneity pixels each with a homogeneity value indicating the local homogeneity of source pixels of the source image; a watershed image module, coupled to the homogeneity image module, for forming a watershed image having watershed segments with a segment weight, the watershed image formed by segmenting the homogeneity image, and for merging one of the watershed segments with another of the watershed segments both having the segment weight less than or equal to a segment threshold; a contour map module, coupled to the watershed image module, for forming a segmentation contour map having boundaries of the watershed segments formed by merging the watershed segments; and a composite image module for forming a composite image with the segmentation contour map for display on a device.

10 Claims, 8 Drawing Sheets

(D) $H \approx 4.2 \cdot D$
FIG. 8

(E) $H \approx 7.5 \cdot D$
FIG. 9

IMAGE PROCESSING SYSTEM WITH AUTOMATIC SEGMENTATION AND METHOD OF OPERATION THEREOF

TECHNICAL FIELD

The present invention relates generally to image processing systems, and more particularly to an image processing system with automatic segmentation.

BACKGROUND ART

The deployment of high quality imaging to medical devices, smart phones, tablet computers, and other information devices with screens has grown tremendously in recent years. The wide variety of information devices supporting image processing and image understanding requires the ability to process multiple types of images with varying degrees of available information.

Medical imaging devices can provide diagnostic images based on different types of sensor information. Some medical imaging systems can display raw or dynamic imaging and video information in real time. Such systems can process image information of varying quality, resolution, and orientation, but still require a high degree of medical expertise to be interpreted properly to help reach an accurate diagnosis of a medical condition.

Other imaging systems can use ultrasound, x-ray, visible light, infrared, sound navigation and ranging (sonar), magnetic resonance imaging, positron emission tomography, or a combination thereof to generate static and dynamic images. Some systems require a priori information about the classes of images being analyzed. Other systems may require manual identification of initial control points to perform segmentation.

Thus, a need still remains for an image processing system that can create good quality images that are easier to interpret. Such images must be provided across a wide range of devices having different sizes, resolutions, memory capacity, compute power, and image quality. In view of the increasing demand for providing diagnostic medical imaging on the growing spectrum of intelligent imaging devices, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to save costs, improve efficiencies and performance, and meet competitive pressures, adds an even greater urgency to the critical necessity for finding answers to these problems.

Solutions to these problems have long been sought but prior developments have not taught or suggested any solutions and, thus, solutions to these problems have long eluded those skilled in the art.

DISCLOSURE OF THE INVENTION

The present invention provides a method of operation of an image processing system including: receiving a source image having source pixels; forming a homogeneity image having homogeneity pixels each with a homogeneity value indicating the local homogeneity of source pixels of the source image; forming a watershed image by segmenting the homogeneity image, the watershed image having watershed segments with a segment weight; merging one of the watershed segments with another of the watershed segments with both of the watershed segments having the segment weight less than or equal to a segment threshold; forming a segmentation contour map having the boundaries of the watershed segments formed by merging the watershed segments; and forming a composite image with the segmentation contour map overlaying the source image for display on a device.

The present invention provides an image processing system including: a source image having source pixels; a homogeneity image module for forming a homogeneity image having homogeneity pixels each with a homogeneity value indicating the local homogeneity of source pixels of the source image; a watershed image module, coupled to the homogeneity image module, for forming a watershed image having watershed segments with a segment weight, the watershed image formed by segmenting the homogeneity image, and for merging one of the watershed segments with another of the watershed segments both having the segment weight less than or equal to a segment threshold; a contour map module, coupled to the watershed image module, for forming a segmentation contour map having boundaries of the watershed segments formed by merging the watershed segments; and a composite image module for forming a composite image with the segmentation contour map overlaying the source image for display on a device.

Certain embodiments of the invention have other aspects in addition to or in place of those mentioned above. The aspects will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that process or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

Likewise, the drawings showing embodiments of the system are semi-diagrammatic and not to scale and, particularly, some of the dimensions are for the clarity of presentation and are shown greatly exaggerated in the drawing FIGS. Where multiple embodiments are disclosed and described, having some features in common, for clarity and ease of illustration, description, and comprehension thereof, similar and like features one to another will ordinarily be described with like reference numerals.

The term "module" referred to herein can include software, hardware, or a combination thereof in the present invention in accordance with the context used. The term "adjacent" means two or more elements are next to one another.

The term "connected" means that two or more pixels or segments are next to one another with no intervening elements. The term "directly connected" means that two or more pixels or segments are in direct contact with one another with no intervening elements.

Figure 1:
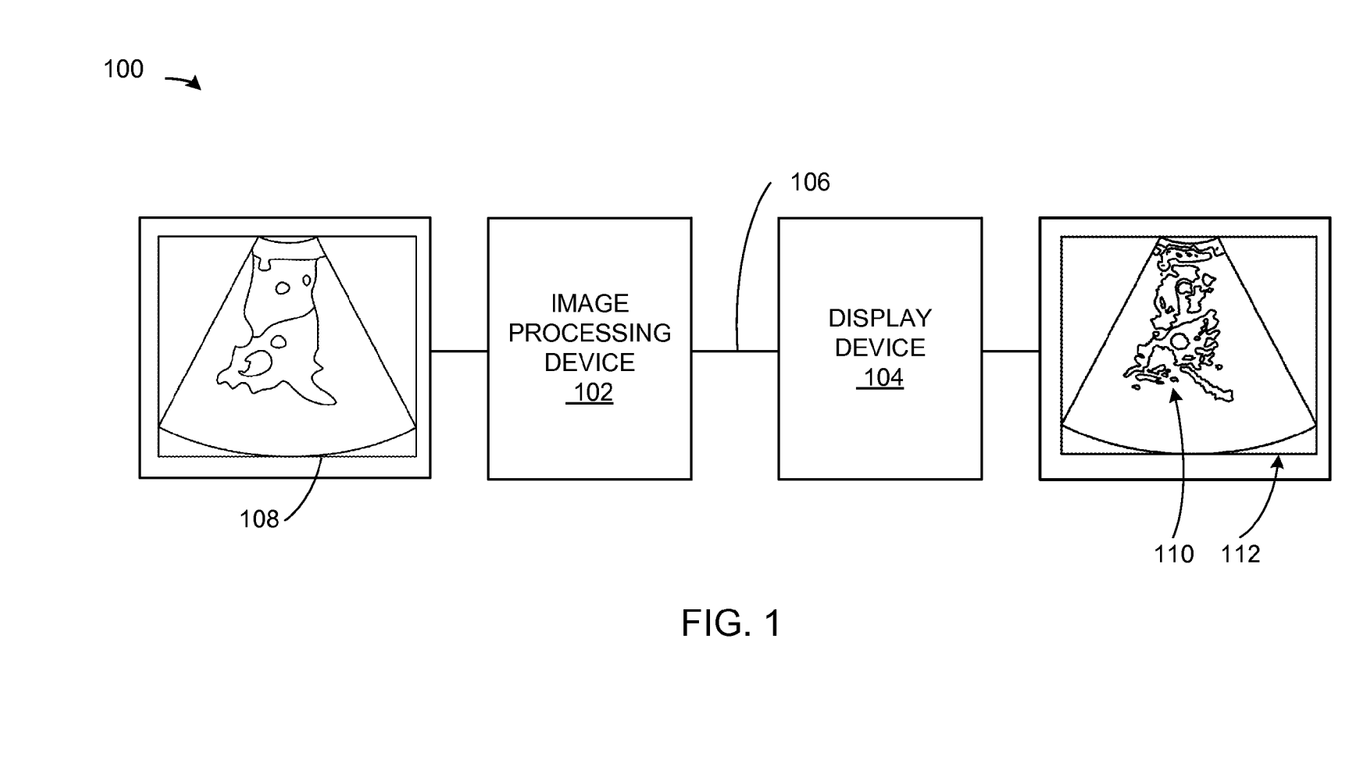
FIG. 1 is a block diagram of an image processing system in an embodiment of the present invention.

Referring now to FIG. 1, therein is shown a block diagram of an image processing system 100 in an embodiment of the present invention. The image processing system 100 can receive a source image 108 in an image processing device 102 and generate a composite image 112 having a segmentation contour map 110 for display on a display device 104. The image processing device 102 can be coupled to the display device 104 with a communication path 106.

The source image 108 is a picture with varying intensity. The source image 108 can be color, monochromatic, or a combination thereof. For example, the source image 108 can be a medical image, a B-mode ultrasound image, an x-ray image, a visible light image, a sonar image, an infrared image, a computer axial tomography image, a magnetic resonance image, or a combination thereof.

The segmentation contour map 110 is a picture indicating the borders between regions representing different objects in the source image 108. The segmentation contour map 110 can be a bitmap, a vector image, or a combination thereof. The segmentation contour map 110 can indicate the variation in intensity between different regions.

The segmentation contour map 110 can be formed without manual initialization. The auto-segmentation of the source image 108 to form the segmentation contour map 110 can be unsupervised and does not require a priori information about the type of images. The segmentation contour map 110 can be calculated using only the information within the source image 108 and does not use initialization input or prior information about the structure of the source image 108. The segmentation contour map 110 can determine the classes outlined by the segmentation contour map 110.

The segmentation contour map 110 can highlight the boundaries of objects represented in the source image 108. For example, the source image 108 can be an ultrasound image with the segmentation contour map 110 indicating the head and body areas of a child. In another example, the source image 108 can be a chest x-ray image and the segmentation contour map 110 can indicate the location and outline of bones and organs.

The segmentation contour map 110 can be combined with the source image 108 to form the composite image 112. The composite image 112 can include the contours overlaid on the source image 108 to highlight and illustrate the underlying elements in the source image 108.

The image processing device 102 is an electrical component for receiving the source image 108. The image processing device 102 can be an ultrasound machine, an x-ray machine, a digital camera, sonar system, video imaging system, or similar device. The image processing device 102 can include a computing device that can receive the source image 108 from a storage device, a network device, or a combination thereof.

The display device 104 is an electrical component for displaying information. For example, the display device 104 can include a monitor, video display, printer, or a combination thereof.

Although the image processing device 102 and the display device 104 are presented as two separate devices, it is understood that the image processing device 102 and the display device 104 can be implemented as a single device. For example, the image processing device 102 can include an integral monitor performing as the display device 104.

Figure 2:
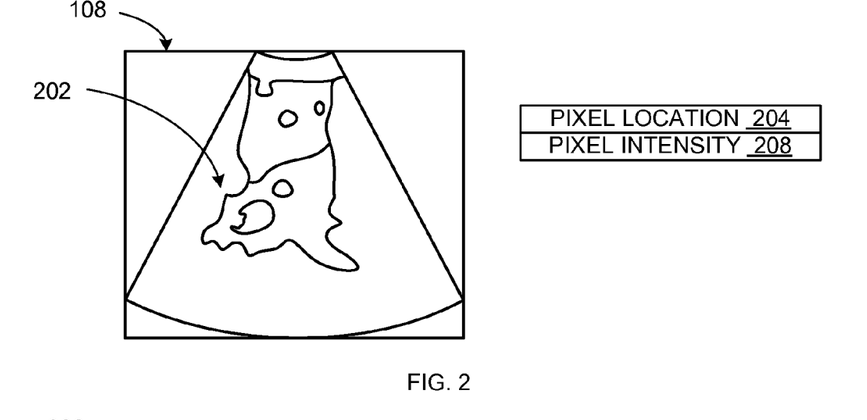
FIG. 2 is an example of the source image.

Referring now to FIG. 2 therein is shown an example of the source image 108. The source image 108 is a picture having source pixels 202. The source pixels 202 are individual graphical elements. The source pixels 202 can have characteristics including a source pixel location 204 and a source pixel intensity 208. For example, the source image 108 can be an ultrasound image.

The source image 108 can be provided in a variety of ways. For example, the source image 108 can be directly formed by imaging sensors of the image processing device 102 of FIG. 1. In another example, the source image 108 can be received from a remote system via a file storage device, a network connection, or a combination thereof.

Figure 3:
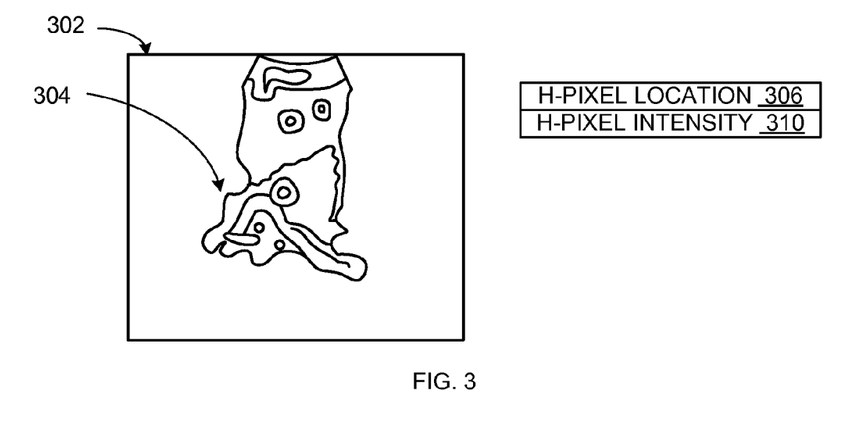
FIG. 3 is an example of a homogeneity image.

Referring now to FIG. 3, therein is shown an example of a homogeneity image 302. The homogeneity image 302 is a digital image derived from the source image 108 of FIG. 1. The homogeneity image 302 can represent the variation in the local homogeneity of the source pixels 202 of FIG. 2 in the source image 108.

The homogeneity image 302 includes homogeneity pixels 304, each corresponding to the homogeneity of one of the source pixels 202 in the corresponding location in the source image 108. The homogeneity pixels 304 can have characteristics such as a homogeneity pixel location 306 and a homogeneity pixel intensity 310.

Figure 4:
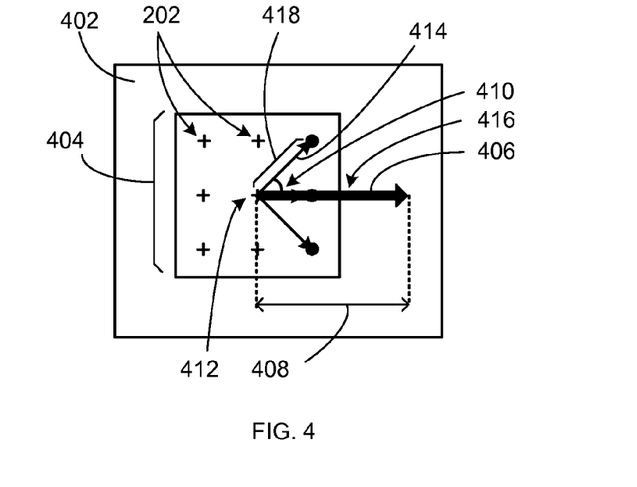
FIG. 4 is an example of the homogeneity measurement.

Referring now to FIG. 4, therein is shown an example of the homogeneity measurement. The homogeneity image 302 of FIG. 3 can be calculated by measuring the level of homogeneity of each of the source pixels 202 in the source image 108 of FIG. 1.

A local window 402 is determined for each of the source pixels 202 in the source image 108. The local window 402 is the set of N×N neighboring pixels around a target pixel 412 where the target pixel 412 is one of the source pixels 202 in the source image 108.

The local window 402 can have a window size 404. The window size 404 is the number of pixels within the local window 402. For example, the window size 404 can have a value of 3×3, 4×4, 5×5, or a similar value.

The target pixel 412 can have a homogeneity vector 406. The homogeneity vector 406 can indicate the degree of homogeneity of the target pixel 412 based on the intensity and location of the source pixels 202 in the local window 402.

The target pixel 412 can have target vectors 414 from the target pixel 412 to each of the source pixels 202 in the local window 402. Each of the target vectors 414 can include a target vector direction 410 and a target vector magnitude 418. The target vector direction 410 is the angle of one of the target vectors 414 measured from the right horizontal direction. The target vector magnitude 418 is the difference of the source pixel intensity 208 of FIG. 2 for one of the source pixels 202 in the local window 402 and that of the target pixel 412.

The homogeneity vector 406 has a homogeneity value 408 and a homogeneity direction 416. The homogeneity value 408 is the magnitude of the sum of all of the target vectors 414 for the target pixel 412. The homogeneity direction 416 is the angle of the sum of all of the target vectors 414 for the target pixel 412.

The homogeneity value 408 can be determined by constructing the target vectors 414 from the target pixel 412 to each of the source pixels 202 in the local window 402 and calculating the magnitude of the sum of all of the target vectors 414. The homogeneity value 408 can be the magnitude of the sum of all of the target vectors 414.

For example, the homogeneity vector 406 can be determined from the sum of the target vectors 414 from the target pixel 412 to the source pixels 202 at the upper right, right, and lower right ones of in the local window 402. The homogeneity value 408 can be the magnitude of the target vectors 414.

It has been discovered that using the homogeneity image 302 to calculate the segmentation contour map 110 of FIG. 1 can improve performance and simplify execution. The homogeneity image 302 is not sensitive to graphical irregularities, noise and results in a more accurate representation of the boundaries between regions.

Figure 5:
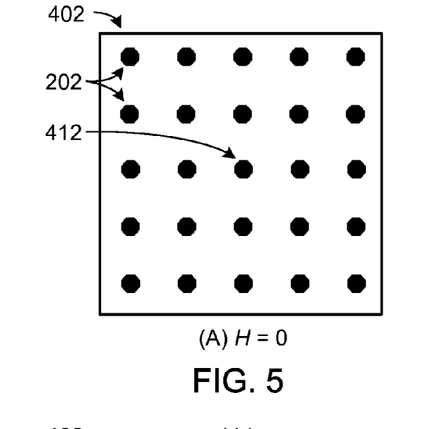
FIG. 5 is a first example of calculating the target vectors.

Referring now to FIG. 5, therein is shown a first example of calculating the target vectors 414 of FIG. 4. The local window 402 can include a 5×5 array of the source pixels 202 around the target pixel 412.

Each of the source pixels 202 in the local window 402 have the same value of the source pixel intensity 208 of FIG. 2 and an uniform distribution around the target pixel 412, so the target vectors 414 will have an undefined or zero direction and the target vector magnitude 418 of FIG. 4 a value of zero. The homogeneity value 408 of FIG. 4 is zero.

Figure 6:
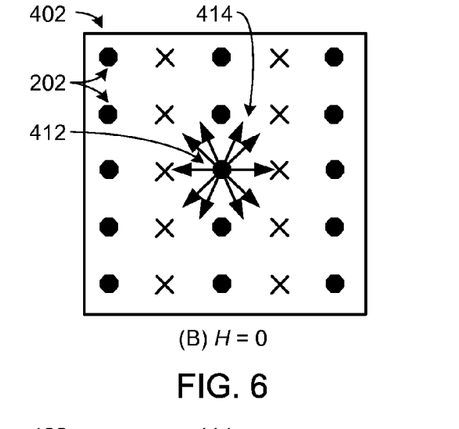
FIG. 6 is a second example of calculating the target vectors.

Referring now to FIG. 6, therein is shown a second example of calculating the target vectors 414. The local window 402 can include a 5×5 array of the source pixels 202 around the target pixel 412. The source pixels 202 in the local window 402 in the first, third, and fifth columns have the same value of the source pixel intensity 208 of FIG. 2. The source pixels 202 in the local window 402 in the second and fourth columns have the source pixel intensity 208 of zero. The source pixels 202 provide even horizontal distribution on either side of the target pixel 412, so the sum of the target vectors 414 will have an undefined or zero direction and the target vector magnitude 418 of FIG. 4 of zero. The homogeneity value 408 of FIG. 4 is zero.

Figure 7:
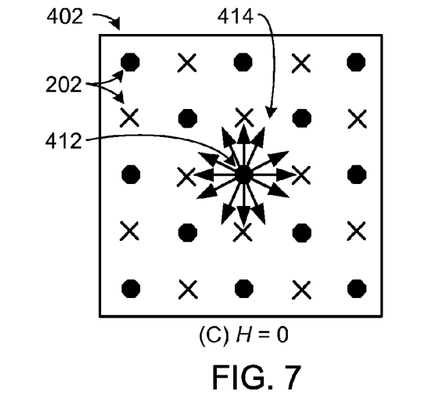
FIG. 7 is a third example of calculating the target vectors.

Referring now to FIG. 7, therein is shown a third example of calculating the target vectors 414. The local window 402 can include a 5×5 array of the source pixels 202 around the target pixel 412. The source pixels 202 in the local window 402 have a value of one or zero in an alternating distribution for each of the columns. The source pixels 202 provide a uniform distribution on all sides of the target pixel 412, so the sum of the target vectors 414 will have an undefined or zero direction and the target vector magnitude 418 of FIG. 4 of zero. The homogeneity value 408 of FIG. 4 is zero.

Figure 8:
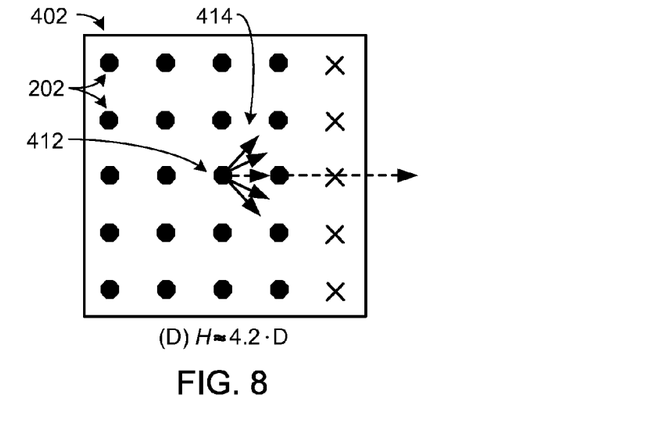
FIG. 8 is a fourth example of calculating the target vectors.

Referring now to FIG. 8, therein is shown a fourth example of calculating the target vectors 414. The local window 402 can include a 5×5 array of the source pixels 202 around the target pixel 412. The source pixels 202 in the local window 402 in the first, second, third, and fourth columns have the same value of one for the source pixel intensity 208 of FIG. 2. The source pixels 202 in the local window 402 in the fifth column have the source pixel intensity 208 of zero. The arrangement of the source pixels 202 can represent the target pixel 412 near a border between two regions in the source image 108 of FIG. 1.

The source pixels 202 provide a uniform vertical distribution, but have an unbalanced horizontal distribution. Calculating the target vectors 414 from the target pixel 412 to each of the other pixels in the local window 402 and summing the result provides a homogeneity value of 4.2 d, where d is the distance between pixels in the source image 108. The sum of the target vectors 414 will have the target vector direction 410 of FIG. 4 of zero degrees based on the uniform vertical distribution of the pixel values.

Figure 9:
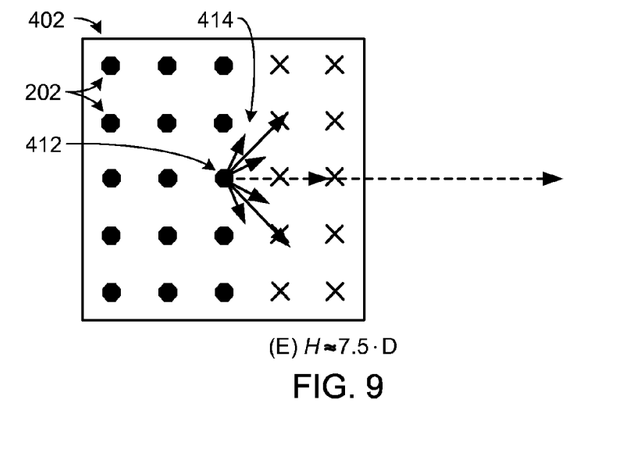
FIG. 9 is a fifth example of calculating the target vectors.

Referring now to FIG. 9, therein is shown a fifth example of calculating the target vectors 414. The local window 402 can include a 5×5 array of the source pixels 202 around the target pixel 412. The source pixels 202 in the local window 402 in the first, second, and third columns have the same value of one for the source pixel intensity 208 of FIG. 2. The source pixels 202 in the local window 402 in the fourth and fifth columns have the source pixel intensity 208 of zero. The arrangement of the source pixels 202 can represent the target pixel 412 at a border between two regions in the source image 108 of FIG. 1.

The source pixels 202 provide a uniform vertical distribution, but have an unbalanced horizontal distribution. Calculating the target vectors 414 from the target pixel 412 to each of the other pixels in the local window 402 and summing the result provides a homogeneity value of 47.5 d, where d is the distance between pixels in the source image 108. The sum of the target vectors 414 will have the target vector direction 410 of FIG. 4 of zero degrees based on the uniform vertical distribution of the pixel values.

Figure 10:
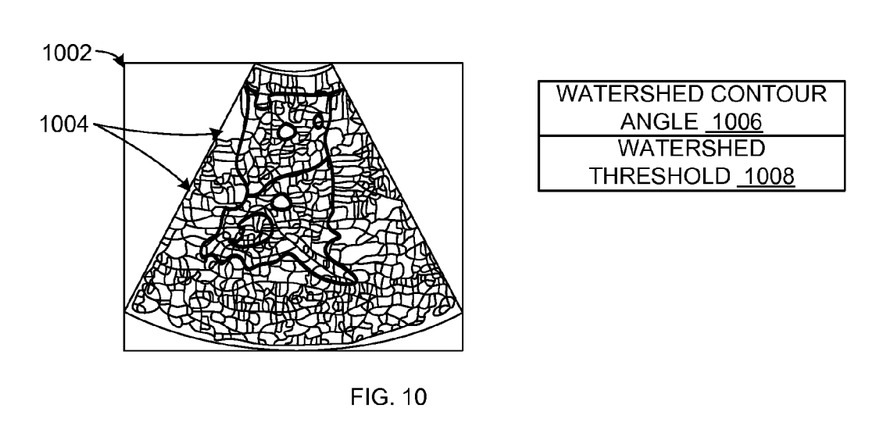
FIG. 10 is an example of a watershed image.

Referring now to FIG. 10, therein is shown an example of a watershed image 1002. The watershed image 1002 is a picture having watershed segments 1004 representing the variation in the homogeneity image 302 of FIG. 3. The watershed image 1002 can be an image with segments based on the intensity variation of the homogeneity pixels 304 of FIG. 3. The watershed image 1002 is formed by segmenting the homogeneity image 302.

The watershed segments 1004 can have a watershed contour angle 1006. The watershed contour angle 1006 is the angle of the line best-fit through one of the watershed segments 1004.

The watershed image 1002 can be calculated in a variety of ways. The watershed image 1002 can be formed using a watershed segmentation technique. For example, the watershed image 1002 can be calculated using marker based transformations, local minima methods, a flooding algorithm, optimal spanning forest algorithms, or a combination thereof. In another example, the watershed image 1002 can be formed using other segmentation techniques.

The watershed segments 1004 can represent the boundaries between regions in the homogeneity image 302. The values of the homogeneity pixels 304 in the homogeneity image 302 can represent a topological relief surface. A watershed threshold 1008 representing a horizontal plane can partition the relief surface into catchment basins below the watershed threshold 1008 and ridges above the watershed threshold 1008. The watershed threshold 1008 can be varied to identify the watershed segments 1004 representing the ridges above the watershed threshold 1008.

It has been discovered that using the homogeneity image 302 to calculate the watershed segments 1004 can improve performance and simplify execution. The homogeneity image 302 is not sensitive to graphical irregularities, noise and results in a more accurate representation of the boundaries between regions.

Figure 11:
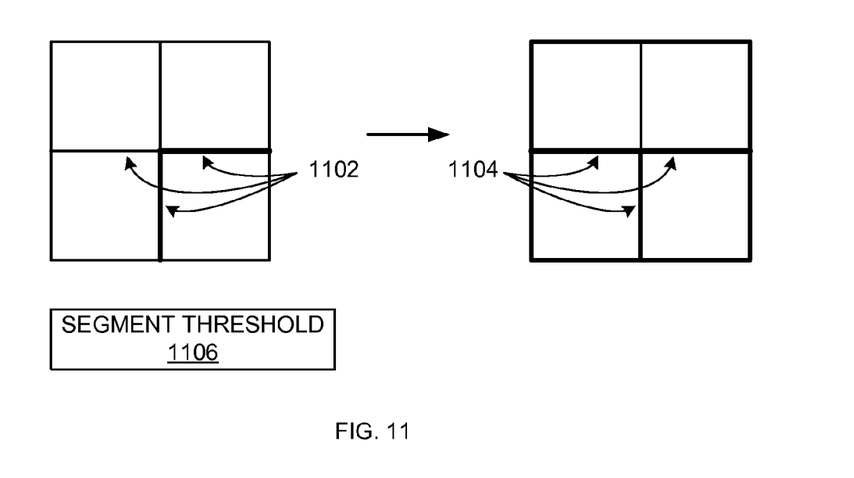
FIG. 11 is an example of hierarchical merging.

Referring now to FIG. 11, therein is shown an example of hierarchical merging. The hierarchical merging process can assigned a segment weight 1102 to each of the watershed segments 1004 of FIG. 10 based on the homogeneity image 302 of FIG. 3 and then hierarchically merge small segments based on the segment weight 1102 to form a single one of the watershed segments 1004. The watershed segments 1004 are structural elements separating regions representing objects in the homogeneity image 302.

The segment weight 1102 is a value indicating the directionality of the homogeneity vector 406 of FIG. 4 for one of the homogeneity pixels 304 of FIG. 3 in the homogeneity image 302. For example, the segment weight 1102 can be the directional component of the homogeneity value 408 of FIG. 4 in the direction of each of the watershed segments 1004 calculated by projecting the homogeneity vector 406 onto the direction of the boundary of each of the watershed segments 1004. Small values of the homogeneity value 408 indicate a homogeneous region, while larger values of the homogeneity value 408 indicate an inhomogeneous region.

The segment weight 1102 is smaller if the homogeneity value 408 in the homogeneity image 302 is small along the contour of one of the watershed segments 1004. The segment weight 1102 can have a larger weight if the homogeneity value 408 in the homogeneity image 302 is larger along the contour of one of the watershed segments 1004. The watershed segments 1004 represent a group of pixels.

The watershed segments 1004 can be hierarchically merged based on the segment weight 1102 of the boundary of each of the watershed segments 1004. The watershed segments 1004 can be merged in the order of segment weight with the watershed segments 1004 having smaller values of the segment weight 1102 merged first. The merge process can stop when the segment weight 1102 of the watershed segments 1004 is above a segment threshold 1106.

The segment threshold 1106 is a value indicating the minimum weight of one of the watershed segments 1004 likely to represent a boundary. The segment threshold 1106 can be pre-determined, dynamically calculated based on the characteristics of the homogeneity image 302, or a combination thereof. For example, the segment threshold 1106 can be calculated using the segmentation output of a graph cut process. The segment threshold 1106 can be adjusted to merge together the watershed segments 1004 caused by graphical irregularities in the homogeneity image 302.

The graph-cut process can final a globally optimal segmentation solution. A graph can be partitioned into two disjoint sets by removing edges connecting the two parts. The segmentation contour map 110 of FIG. 1 can be partitioned by removing one of the watershed segments 1004 in the watershed image 1002 before forming the segmentation contour map 110.

The group-cut results provide the boundaries of the two disjoint sets of image pixels. First, collect the weights of the boundaries of the watershed segments that are most close to the boundaries of the two disjoint sets of image pixels. Then set the median value of the collected weights as the segment threshold.

Two of the watershed segments 1004 that are directly connected to one another with no intervening elements and both have the segment weight 1102 less than or equal to the segment threshold 1106 can be merged together. For example, merging two of the watershed segments 1004 can be performed by assigning all of the pixels of one of the watershed segments 1004 to the other one of the watershed segments 1004.

The hierarchically connected segments can be used to form the segmentation contour map 110. The segmentation contour map 110 can indicate the edges of regions within the source image 108 of FIG. 1. Different values for the segment threshold 1106 can result in different merging results for the segmentation contour map 110. The segmentation contour map 110 can be threshold to optimize the final result by changing the value of the segment threshold 1106. The boundary between two segments is removed and the two segments become connected. The merge process is hierarchical because two small segments produced by the watershed process are merged to form a larger segment, and the larger segment can be merged with another segment to form a still larger segment.

It has been discovered that merging the watershed segments 1004 with weak boundaries having the segment weight 1102 less than the segment threshold 1106 can increase performance by eliminating the need to determine the number of classes. By merging the watershed segments 1004 having small values of the homogeneity value 408, the weak boundaries can be eliminated while preserving the strong boundaries between regions.

It has been discovered that hierarchically merging the watershed segments 1004 calculated based on the homogeneity image 302 can increase performance by auto-segmenting general images without supervision. The automated process of merging the watershed segments 1004 based on the segment threshold 1106 allows faster, unsupervised determination of the segmentation contour map 110.

Figure 12:
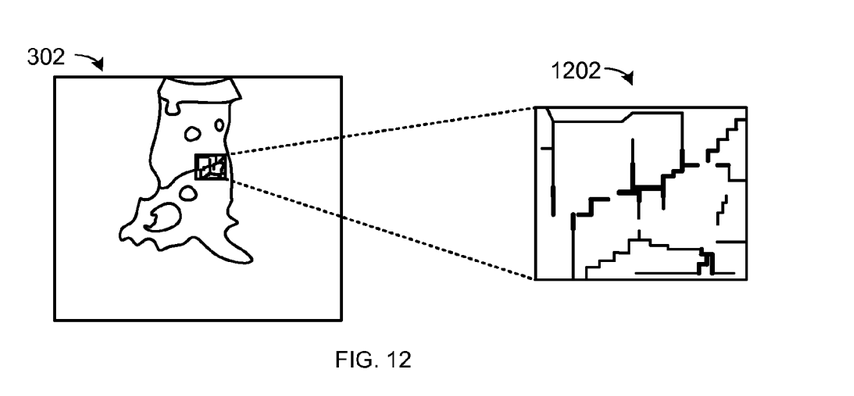
FIG. 12 is an example of an expanded view of the segment weight map.

Referring now to FIG. 12, therein is shown an example of an expanded view 1202 of the segment weight map. The segment weight map can show the segment weights if only using the pixel values of the homogeneity image 302. The expanded view 1202 shows details of the segment weights if only using the pixel values of the homogeneity image 302. The expanded view 1202 shows that the variations in the homogeneity image 302 can generate artifacts. Compensating for the artifacts can be done by taking into consideration how well the boundary norm direction is aligned with the direction of the homogeneity vectors forming the homogeneity field of the homogeneity image 302.

Figure 13:
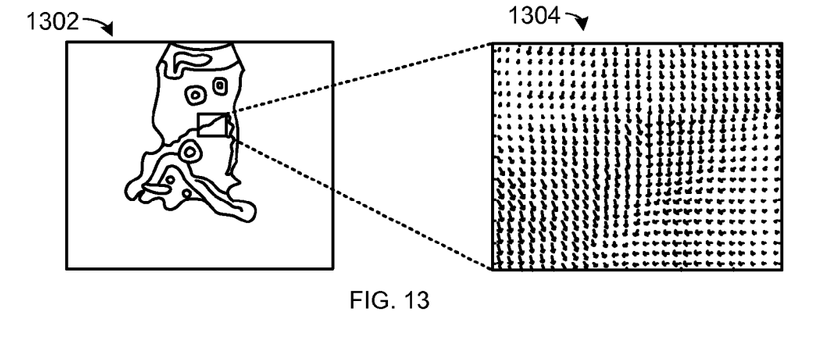
FIG. 13 is an example of a homogeneity field with an expanded view.

Referring now to FIG. 13, therein is shown an example of a homogeneity field 1302 with an expanded view 1304. The homogeneity field 1302 is vector field formed by the homogeneity image 302 of FIG. 3. The homogeneity direction 416 of FIG. 4 of the target pixel 412 of FIG. 4 can be measured against the norm for a boundary direction to reduce the number of artifacts. The homogeneity field 1302 can be the aggregation of the homogeneity value 408 of FIG. 4 and the homogeneity direction 416 of FIG. 4 for the homogeneity vector 406 of FIG. 4 of each of the homogeneity pixels 304 of FIG. 3.

Figure 14:
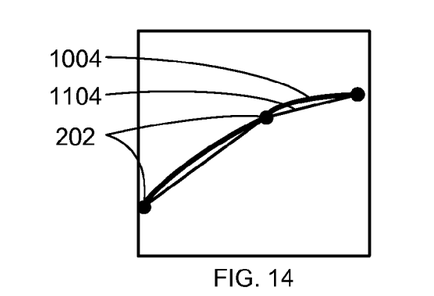
FIG. 14 is an example of boundary direction approximation.

Referring now to FIG. 14, therein is shown an example of segment boundary direction approximation. The boundaries of the watershed segments 1004 can be approximated with straight line segments 1104. The directions of the straight line segments 1104 are straight line approximations of the direction of the boundaries of watershed segments 1004.

Figure 15:
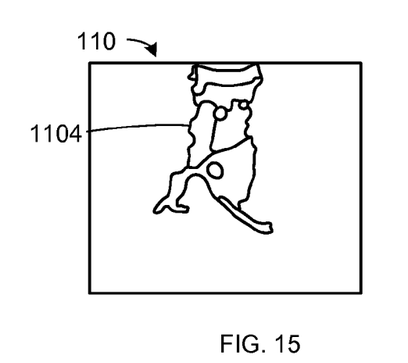
FIG. 15 is an example of the segmentation contour map.

Referring now to FIG. 15, therein is shown an example of the segmentation contour map 110. The segmentation contour map 110 can indicate the boundaries of objects representing in the source image 108 of FIG. 1. The segmentation contour map 110 can show the contour lines between different regions within the source image 108.

Figure 16:
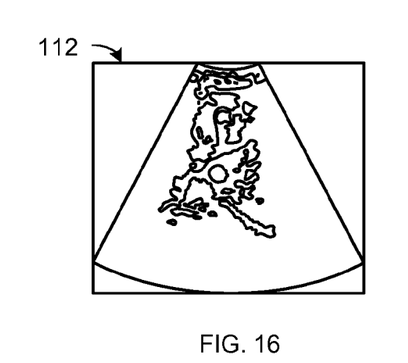
FIG. 16 is an example of the composite image.

Referring now to FIG. 16, therein is shown an example of the composite image 112. The composite image 112 shows the segmentation contour map 110 of FIG. 1 overlaid on the source image 108 of FIG. 1 show highlight the boundaries of different regions. For example, the composite image 112 can outline the boundaries between heads, arms, and legs in an ultrasound image.

Figure 17:
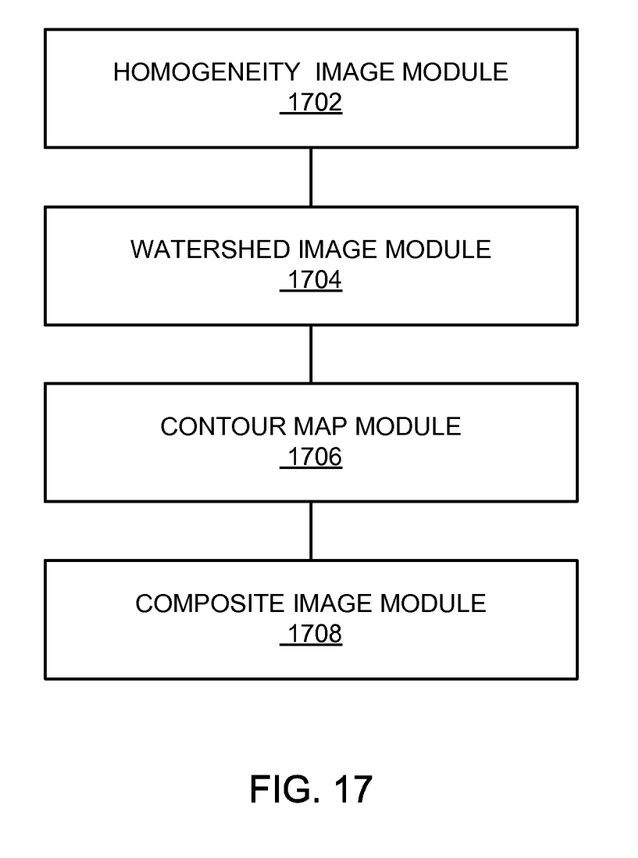
FIG. 17 is a process flow of the image processing system.

Referring now to FIG. 17, therein is shown a process flow for the image processing system 100 of FIG. 1. The image processing system 100 can process the source image 108 of FIG. 1 and display the composite image 112 of FIG. 1 having the segmentation contour map 110 of FIG. 1 on the display device 104 of FIG. 1. The image processing system 100 can include a homogeneity image module 1702, a watershed image module 1704, a contour map module 1706, and a composite image module 1708.

The homogeneity image module 1702 can form the homogeneity image 302 of FIG. 3 from the source image 108. Each of the source pixels 202 of FIG. 2 in the source image 108 can have a corresponding one of the homogeneity pixels 304 of FIG. 3 in the homogeneity image 302.

The homogeneity image module 1702 can calculate the homogeneity vector 406 of FIG. 4 for each of the source pixels 202 in the source image 108. The homogeneity value 408 of FIG. 4 associated with the homogeneity vector 406 can be used to set the associated value of the homogeneity pixels 304 in the homogeneity image 302 for the corresponding one of the source pixels 202.

The homogeneity image module 1702 can calculate the local window 402 of FIG. 4 for each of the source pixels 202 in the source image 108. The window size 404 of FIG. 4 can be set dynamically, pre-determined, based on image classification, or a combination thereof.

Each of the source pixels 202 can be designated as the target pixel 412 of FIG. 4. The target pixel 412 of FIG. 4 can be determined by iterating over all of the source pixels 202 in the source image 108.

The local window 402 is an N×N array centered on the target pixel 412 where N is the window size 404. The homogeneity image module 1702 can calculate the set of the target vectors 414 of FIG. 4 from the target pixel 412 to each of the source pixels 202 in the local window 402. Each of the source pixels 202 can have (N×N)−1 of the target vectors 414 associated with the target pixel 412.

The homogeneity image module 1702 can calculate the homogeneity vector 406 for the target pixel 412 based on the target vectors 414. The homogeneity vector 406 can indicate the degree of homogeneity of the target pixel 412 based on the intensity and location of the source pixels 202 in the local window 402. The homogeneity vector 406 is calculated based on the sum of all of the target vectors 414 in the local window 402.

The homogeneity vector 406 has the homogeneity value 408 and the homogeneity direction 416 of FIG. 4. The homogeneity value 408 is the magnitude of the sum of all of the target vectors 414 for the target pixel 412. The homogeneity direction 416 is the angle of the sum of all of the target vectors 414 for the target pixel 412.

The homogeneity value 408 can be the magnitude of the sum of all of the set of the target vectors 414. The homogeneity value 408 can indicate the local homogeneity of the source image 108.

The homogeneity image 302 is formed by calculating the homogeneity value 408 for the homogeneity pixels 304. Each of the homogeneity pixels 304 can be assigned the homogeneity value 408 of the target pixel 412 at the corresponding location in the homogeneity image 302.

After the homogeneity image module 1702 calculates the homogeneity image 302, the control flow can pass to the watershed image module 1704.

The watershed image module 1704 can form the watershed image 1002 of FIG. 10 based on the homogeneity image 302. The watershed image 1002 can be calculated using a watershed segmentation technique. The watershed image 1002 can include the watershed segments 1004 of FIG. 10 partitioning the regions of the homogeneity image 302 based on the intensity of the homogeneity pixels 304 in the homogeneity image 302.

The watershed image module 1704 can apply the watershed segmentation process to generate the watershed segments 1004 representing the boundary between regions in the homogeneity image 302. The watershed segments 1004 can indicate boundaries having similar values for the homogeneity value 408 of the homogeneity pixels 304 in the homogeneity image 302. For example, the watershed segments 1004 act like the ridges between catchment basin regions having similar properties.

The watershed segmentation process can be sensitive to noise and other image irregularities in the homogeneity image 302. Calculating the watershed image 1002 can result in over-segmentation where an excess of the watershed segments 1004 are detected due to the image irregularities such as noise, pixel variations, shadows, or a combination thereof.

The overabundance of the watershed segments 1004 can make it difficult to detect the underlying objects represented in the source image 108. Each of the local regional minimums within the homogeneity image 302 can be segmented. For example, each of the pixels representing noise or small irregularities can be surrounded by the watershed segments 1004.

To reduce the overabundance of the watershed segments 1004, the watershed image module 1704 can perform a hierarchical merging process to merge the watershed segments 1004 that are connected to one another. The watershed segments 1004 can be merged together into a single large one of the watershed segments 1004 to reduce the level of segmentation.

The boundary of each of the watershed segments 1004 can have the segment weight 1102 of FIG. 11 assigned based on the directionality of the homogeneity value 408 of the homogeneity pixels 304 at that location. Then the watershed segments 1004 can be hierarchically merged small segments based on the segment weight 1102 being less than the segment threshold 1106 of FIG. 11. The segment threshold 1106 can be pre-determined, calculated dynamically, or a combination thereof.

The segment weight 1102 can be calculated by determining the directionality of the homogeneity vector 406 for one of the homogeneity pixels 304 in the homogeneity image 302. The segment weight 1102 is smaller if the homogeneity value 408 in the homogeneity image 302 is small along the contour of one of the watershed segments 1004. The segment weight 1102 can have a larger weight if the homogeneity value 408 in the homogeneity image 302 is larger along the contour of one of the watershed segments 1004.

The watershed image module 1704 can merge two of the watershed segments 1004 that are connected to one another and both have the segment weight 1102 below the segment threshold 1106. The values for the segment threshold 1106 can vary and result in different merging results for the watershed segments 1004. The merger process can iterate over all of the watershed segments 1004 to reduce the number of segments and form the boundaries around larger regions in the homogeneity image 302. After the watershed image 1002 has been formed and the watershed segments 1004 merged to reduce the level of over-segmentation, the control flow can pass to the contour map module 1706.

It has been discovered that merging the watershed segments 1004 based on the segment weight 1102 can increase the accuracy of the segmentation contour map 110. Growing the regions by merging the watershed segments 1004 groups together similar adjacent regions.

The contour map module 1706 can form the segmentation contour map 110 by merging the watershed segments 1004 based on their segment weights. The segment weight is determined by the homogeneity value 408, the direction of homogeneity vector 406 and the directions of boundaries of watershed segments 1004. The straight line segments 1104 are line segments that approximate the boundaries of the watershed segments 1004. The straight line segments 1104 can be calculated by determining the parameters of lines through the ends of one of the watershed segments 1004. The set of the boundaries of the segments after merging can then be used to form the segmentation contour map 110. The segmentation contour map 110 can indicate the edges of regions representing object within the source image 108. After forming the segmentation contour map 110, the control flow can pass to the composite image module 1708.

The composite image module 1708 can combine the segmentation contour map 110 and the source image 108 to highlight the regions in the source image 108 representing object of interest. The segmentation contour map 110 can be overlaid on the source image 108. The composite image 112 can be displayed on the display device 104.

Figure 18:
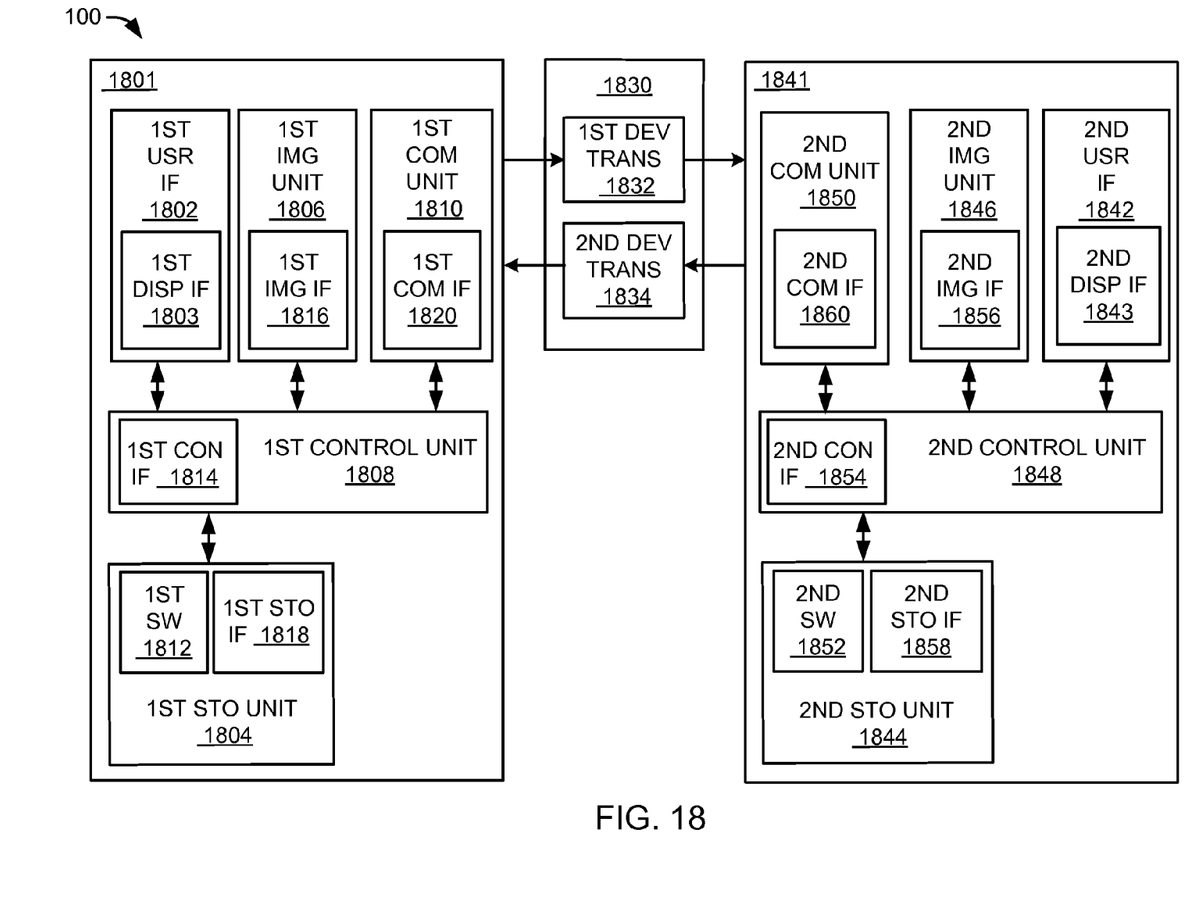
FIG. 18 is an example of a functional block diagram of the image processing system.

Referring now to FIG. 18, therein is shown an example of a functional block diagram of the image processing system 100. The image processing system 100 can include a first device 1801, a second device 1841 and a communication link 1830.

The image processing system 100 can be implemented using the first device 1801, the second device 1841, and the communication link 1830. For example, the first device 1801 can implement the image processing device 102 of FIG. 1, the second device 1841 can implement the display device 104 of FIG. 1. And the communication link 1830 can implement the communication path 106 of FIG. 1. However, it is understood that the image processing system 100 can be implemented in a variety of ways and the functionality of the image processing device 102, the display device 104, and the communication path 106 can be partitioned differently over the first device 1801, the second device 1841, and the communication link 1830.

The first device 1801 can communicate with the second device 1841 over the communication link 1830. The first device 1801 can send information in a first device transmission 1832 over the communication link 1830 to the second device 1841. The second device 1841 can send information in a second device transmission 1834 over the communication link 1830 to the first device 1801.

For illustrative purposes, the image processing system 100 is shown with the first device 1801 as a client device, although it is understood that the image processing system 100 can have the first device 1801 as a different type of device. For example, the first device can be a server.

Also for illustrative purposes, the image processing system 100 is shown with the second device 1841 as a server, although it is understood that the image processing system 100 can have the second device 1841 as a different type of device. For example, the second device 1841 can be a client device.

For brevity of description in this embodiment of the present invention, the first device 1801 will be described as a client device, such as a video camera, smart phone, or a combination thereof. The present invention is not limited to this selection for the type of devices. The selection is an example of the present invention.

The first device 1801 can include a first control unit 1808. The first control unit 1808 can include a first control interface 1814. The first control unit 1808 can execute a first software 1812 to provide the intelligence of the image processing system 100.

The first control unit 1808 can be implemented in a number of different manners. For example, the first control unit 1808 can be a processor, an embedded processor, a microprocessor, a hardware control logic, a hardware finite state machine (FSM), a digital signal processor (DSP), or a combination thereof.

The first control interface 1814 can be used for communication between the first control unit 1808 and other functional units in the first device 1801. The first control interface 1814 can also be used for communication that is external to the first device 1801.

The first control interface 1814 can receive information from the other functional units or from external sources, or can transmit information to the other functional units or to external destinations. The external sources and the external destinations refer to sources and destinations external to the first device 1801.

The first control interface 1814 can be implemented in different ways and can include different implementations depending on which functional units or external units are being interfaced with the first control interface 1814. For example, the first control interface 1814 can be implemented with electrical circuitry, microelectromechanical systems (MEMS), optical circuitry, wireless circuitry, wireline circuitry, or a combination thereof.

The first device 1801 can include a first storage unit 1804. The first storage unit 1804 can store the first software 1812. The first storage unit 1804 can also store the relevant information, such as images, syntax information, video, profiles, display preferences, sensor data, or any combination thereof.

The first storage unit 1804 can be a volatile memory, a nonvolatile memory, an internal memory, an external memory, or a combination thereof. For example, the first storage unit 1804 can be a nonvolatile storage such as nonvolatile random access memory (NVRAM), Flash memory, disk storage, or a volatile storage such as static random access memory (SRAM).

The first storage unit 1804 can include a first storage interface 1818. The first storage interface 1818 can be used for communication between the first storage unit 1804 and other functional units in the first device 1801. The first storage interface 1818 can also be used for communication that is external to the first device 1801.

The first device 1801 can include a first imaging unit 1806. The first imaging unit 1806 can capture the source image 108 of FIG. 1 from the real world. The first imaging unit 1806 can include a digital camera, a video camera, an optical sensor, or any combination thereof.

The first imaging unit 1806 can include a first imaging interface 1816. The first imaging interface 1816 can be used for communication between the first imaging unit 1806 and other functional units in the first device 1801.

The first imaging interface 1816 can receive information from the other functional units or from external sources, or can transmit information to the other functional units or to external destinations. The external sources and the external destinations refer to sources and destinations external to the first device 1801.

The first imaging interface 1816 can include different implementations depending on which functional units or external units are being interfaced with the first imaging unit 1806. The first imaging interface 1816 can be implemented with technologies and techniques similar to the implementation of the first control interface 1814.

The first storage interface 1818 can receive information from the other functional units or from external sources, or can transmit information to the other functional units or to external destinations. The external sources and the external destinations refer to sources and destinations external to the first device 1801.

The first storage interface 1818 can include different implementations depending on which functional units or external units are being interfaced with the first storage unit 1804. The first storage interface 1818 can be implemented with technologies and techniques similar to the implementation of the first control interface 1814.

The first device 1801 can include a first communication unit 1810. The first communication unit 1810 can be for enabling external communication to and from the first device 1801. For example, the first communication unit 1810 can permit the first device 1801 to communicate with the second device 1841, an attachment, such as a peripheral device or a computer desktop, and the communication link 1830.

The first communication unit 1810 can also function as a communication hub allowing the first device 1801 to function as part of the communication link 1830 and not limited to be an end point or terminal unit to the communication link 1830. The first communication unit 1810 can include active and passive components, such as microelectronics or an antenna, for interaction with the communication link 1830.

The first communication unit 1810 can include a first communication interface 1820. The first communication interface 1820 can be used for communication between the first communication unit 1810 and other functional units in the first device 1801. The first communication interface 1820 can receive information from the other functional units or can transmit information to the other functional units.

The first communication interface 1820 can include different implementations depending on which functional units are being interfaced with the first communication unit 1810. The first communication interface 1820 can be implemented with technologies and techniques similar to the implementation of the first control interface 1814.

The first device 1801 can include a first user interface 1802. The first user interface 1802 allows a user (not shown) to interface and interact with the first device 1801. The first user interface 1802 can include a first user input (not shown). The first user input can include touch screen, gestures, motion detection, buttons, slicers, knobs, virtual buttons, voice recognition controls, or any combination thereof.

The first user interface 1802 can include the first display interface 1803. The first display interface 1803 can allow the user to interact with the first user interface 1802. The first display interface 1803 can include a display, a video screen, a speaker, or any combination thereof.

The first control unit 1808 can operate with the first user interface 1802 to display image information generated by the image processing system 100 on the first display interface 1803. The first control unit 1808 can also execute the first software 1812 for the other functions of the image processing system 100, including receiving image information from the first storage unit 1804 for display on the first display interface 1803. The first control unit 1808 can further execute the first software 1812 for interaction with the communication link 1830 via the first communication unit 1810.

For illustrative purposes, the first device 1801 can be partitioned having the first user interface 1802, the first storage unit 1804, the first control unit 1808, and the first communication unit 1810, although it is understood that the first device 1801 can have a different partition. For example, the first software 1812 can be partitioned differently such that some or all of its function can be in the first control unit 1808 and the first communication unit 1810. Also, the first device 1801 can include other functional units not shown in FIG. 17 for clarity.

The image processing system 100 can include the second device 1841. The second device 1841 can be optimized for implementing the present invention in a multiple device embodiment with the first device 1801. The second device 1841 can provide the additional or higher performance processing power compared to the first device 1801.

The second device 1841 can include a second control unit 1848. The second control unit 1848 can include a second control interface 1854. The second control unit 1848 can execute a second software 1852 to provide the intelligence of the image processing system 100.

The second control unit 1848 can be implemented in a number of different manners. For example, the second control unit 1848 can be a processor, an embedded processor, a microprocessor, a hardware control logic, a hardware finite state machine (FSM), a digital signal processor (DSP), or a combination thereof.

The second control interface 1854 can be used for communication between the second control unit 1848 and other functional units in the second device 1841. The second control interface 1854 can also be used for communication that is external to the second device 1841.

The second control interface 1854 can receive information from the other functional units or from external sources, or can transmit information to the other functional units or to external destinations. The external sources and the external destinations refer to sources and destinations external to the second device 1841.

The second control interface 1854 can be implemented in different ways and can include different implementations depending on which functional units or external units are being interfaced with the second control interface 1854. For example, the second control interface 1854 can be implemented with electrical circuitry, microelectromechanical systems (MEMS), optical circuitry, wireless circuitry, wireline circuitry, or a combination thereof.

The second device 1841 can include a second storage unit 1844. The second storage unit 1844 can store the second software 1852. The second storage unit 1844 can also store the relevant information, such as images, syntax information, video, profiles, display preferences, sensor data, or any combination thereof.

The second storage unit 1844 can be a volatile memory, a nonvolatile memory, an internal memory, an external memory, or a combination thereof. For example, the second storage unit 1844 can be a nonvolatile storage such as non-volatile random access memory (NVRAM), Flash memory, disk storage, or a volatile storage such as static random access memory (SRAM).

The second storage unit 1844 can include a second storage interface 1858. The second storage interface 1858 can be used for communication between the second storage unit 1844 and other functional units in the second device 1841. The second storage interface 1858 can also be used for communication that is external to the second device 1841.

The second storage interface 1858 can receive information from the other functional units or from external sources, or can transmit information to the other functional units or to external destinations. The external sources and the external destinations refer to sources and destinations external to the second device 1841.

The second storage interface 1858 can include different implementations depending on which functional units or external units are being interfaced with the second storage unit 1844. The second storage interface 1858 can be implemented with technologies and techniques similar to the implementation of the second control interface 1854.

The second device 1841 can include a second imaging unit 1846. The second imaging unit 1846 can capture the source image 108 from the real world. The first imaging unit 1806 can include a digital camera, a video camera, an optical sensor, or any combination thereof.

The second imaging unit 1846 can include a second imaging interface 1856. The second imaging interface 1856 can be used for communication between the second imaging unit 1846 and other functional units in the second device 1841.

The second imaging interface 1856 can receive information from the other functional units or from external sources, or can transmit information to the other functional units or to external destinations. The external sources and the external destinations refer to sources and destinations external to the second device 1841.

The second imaging interface 1856 can include different implementations depending on which functional units or external units are being interfaced with the second imaging unit 1846. The second imaging interface 1856 can be implemented with technologies and techniques similar to the implementation of the first control interface 1814.

The second device 1841 can include a second communication unit 1850. The second communication unit 1850 can enable external communication to and from the second device 1841. For example, the second communication unit 1850 can permit the second device 1841 to communicate with the first device 1801, an attachment, such as a peripheral device or a computer desktop, and the communication link 1830.

The second communication unit 1850 can also function as a communication hub allowing the second device 1841 to function as part of the communication link 1830 and not limited to be an end point or terminal unit to the communication link 1830. The second communication unit 1850 can include active and passive components, such as microelectronics or an antenna, for interaction with the communication link 1830.

The second communication unit 1850 can include a second communication interface 1860. The second communication interface 1860 can be used for communication between the second communication unit 1850 and other functional units in the second device 1841. The second communication interface 1860 can receive information from the other functional units or can transmit information to the other functional units.

The second communication interface 1860 can include different implementations depending on which functional units are being interfaced with the second communication unit 1850. The second communication interface 1860 can be implemented with technologies and techniques similar to the implementation of the second control interface 1854.

The second device 1841 can include a second user interface 1842. The second user interface 1842 allows a user (not shown) to interface and interact with the second device 1841. The second user interface 1842 can include a second user input (not shown). The second user input can include touch screen, gestures, motion detection, buttons, slicers, knobs, virtual buttons, voice recognition controls, or any combination thereof.

The second user interface 1842 can include a second display interface 1843. The second display interface 1843 can allow the user to interact with the second user interface 1842. The second display interface 1843 can include a display, a video screen, a speaker, or any combination thereof.

The second control unit 1848 can operate with the second user interface 1842 to display information generated by the image processing system 100 on the second display interface 1843. The second control unit 1848 can also execute the second software 1852 for the other functions of the image processing system 100, including receiving display information from the second storage unit 1844 for display on the second display interface 1843. The second control unit 1848 can further execute the second software 1852 for interaction with the communication link 1830 via the second communication unit 1850.

For illustrative purposes, the second device 1841 can be partitioned having the second user interface 1842, the second storage unit 1844, the second control unit 1848, and the second communication unit 1850, although it is understood that the second device 1841 can have a different partition. For example, the second software 1852 can be partitioned differently such that some or all of its function can be in the second control unit 1848 and the second communication unit 1850. Also, the second device 1841 can include other functional units not shown in FIG. 17 for clarity.

The first communication unit 1810 can couple with the communication link 1830 to send information to the second device 1841 in the first device transmission 1832. The second device 1841 can receive information in the second communication unit 1850 from the first device transmission 1832 of the communication link 1830.

The second communication unit 1850 can couple with the communication link 1830 to send image information to the first device 1801 in the second device transmission 1834. The first device 1801 can receive image information in the first communication unit 1810 from the second device transmission 1834 of the communication link 1830. The image processing system 100 can be executed by the first control unit 1808, the second control unit 1848, or a combination thereof.

The functional units in the first device 1801 can work individually and independently of the other functional units. For illustrative purposes, the image processing system 100 is described by operation of the first device 1801. It is understood that the first device 1801 can operate any of the modules and functions of the image processing system 100. For example, the first device 1801 can be described to operate the first control unit 1808.

The functional units in the second device 1841 can work individually and independently of the other functional units. For illustrative purposes, the image processing system 100 can be described by operation of the second device 1841. It is understood that the second device 1841 can operate any of the modules and functions of the image processing system 100. For example, the second device 1841 is described to operate the second control unit 1848.

For illustrative purposes, the image processing system 100 is described by operation of the first device 1801 and the second device 1841. It is understood that the first device 1801 and the second device 1841 can operate any of the modules and functions of the image processing system 100. For example, the first device 1801 is described to operate the first control unit 1808, although it is understood that the second device 1841 can also operate the first control unit 1808.

The physical transformation from the images of physical objects of the source image 108 to displaying the output text on the pixel elements of the display device 104 results in physical changes to the pixel elements of the display device 104 in the physical world, such as the change of electrical state the pixel element, is based on the operation of the image processing system 100. As the changes in the physical world occurs, such as the motion of the imaging sensor used to capture the source image 108, the movement itself creates additional information, such as the updates to the source image 108, that are converted back into changes in the pixel elements of the display device 104 for continued operation of the image processing system 100.

The first software 1812 of the first device 1801 can implement portions of the image processing system 100. For example, the first software 1812 can include the homogeneity image module 1702 of FIG. 17, the watershed image module 1704 of FIG. 17, the contour map module 1706 of FIG. 17, and the composite image module 1708 of FIG. 17.

The first control unit 1808 can execute the first software 1812 for the homogeneity image module 1702 to form the homogeneity image 302 of FIG. 3 from the source image 108. The first control unit 1808 can execute the first software 1812 for the watershed image module 1704 to form the watershed image 1002 of FIG. 10 from the homogeneity image 302. The first control unit 1808 can execute the first software 1812 for the contour map module 1706 to form the segmentation contour map 110 of FIG. 1 from the watershed image 1002. The first control unit 1808 can execute the first software 1812 for the composite image module 1708 to form the composite image 112 of FIG. 1 from the segmentation contour map 110 and the source image 108.

The second software 1852 of the second device 1841 can implement portions of the image processing system 100. For example, the second software 1852 can include the homogeneity image module 1702, the watershed image module 1704, the contour map module 1706, and the composite image module 1708.

The second control unit 1848 can execute the second software 1852 for the homogeneity image module 1702 to form the homogeneity image 302 of FIG. 3 from the source image 108. The second control unit 1848 can execute the second software 1852 for the watershed image module 1704 to form the watershed image 1002 from the homogeneity image 302. The second control unit 1848 can execute the second software 1852 for the contour map module 1706 to form the segmentation contour map 110 from the watershed image 1002. The second control unit 1848 can execute the second software 1852 for the composite image module 1708 to form the composite image 112 from the segmentation contour map 110 and the source image 108.

The image processing system 100 can be partitioned between the first software 1812 and the second software 1852. For example, the first software 1812 can include the homogeneity image module 1702 and the watershed image module 1704 and the second software 1852 can include the contour map module 1706 and the composite image module 1708. The first control unit 1808 can execute the modules partitioned to the first software 1812. The second control unit 1848 can execute modules partitioned to the second software 1852.

The first control unit 1808 can operate the first communication unit 1810 to send the source image 108 to the second device 1841. The first control unit 1808 can operate the first software 1812 to operate the first imaging unit 1806. The second communication unit 1850 can send the source image 108 to the first device 1801 over the communication link 1830.

The image processing system 100 describes the module functions or order as an example. The modules can be partitioned differently. For example, the contour map module 1706 and the composite image module 1708 can be combined. Each of the modules can operate individually and independently of the other modules.

Furthermore, data generated in one module can be used by another module without being directly coupled to each other. For example, the composite image module 1708 can receive the source image 108 from the homogeneity image module 1702.

The modules can be implemented in a variety of ways. The homogeneity image module 1702 and the watershed image module 1704 can be implemented in hardware accelerators (not shown) within the first control unit 1808 or the second control unit 1848, or can be implemented in hardware accelerators (not shown) in the first device 1801 or the second device 1841 outside of the first control unit 1808 or the second control unit 1848.

Figure 19:
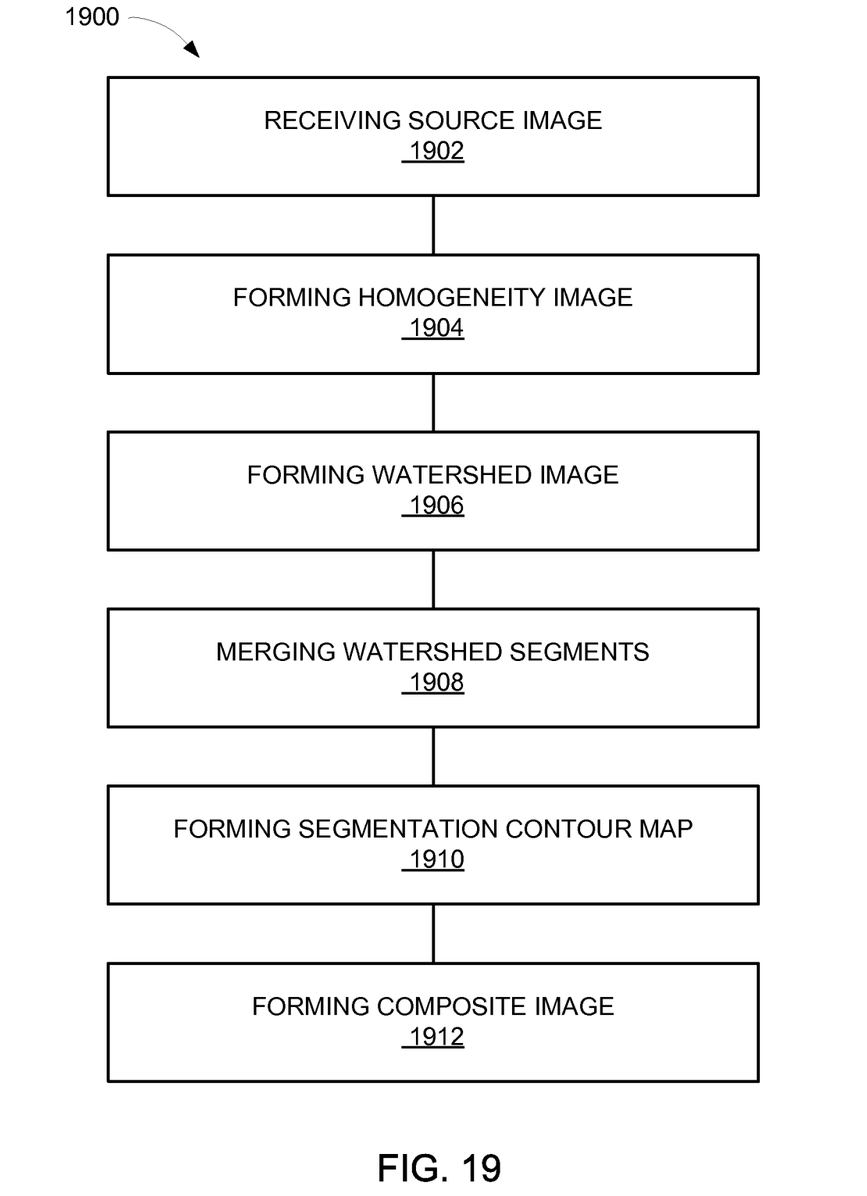
FIG. 19 is a flow chart of a method of operation of the image processing system in a further embodiment of the present invention.

Referring now to FIG. 19, therein is shown a flow chart of a method 1900 of operation of the image processing system in a further embodiment of the present invention. The method 1900 includes: receiving a source image having source pixels in a block 1902; forming a homogeneity image having homogeneity pixels each with a homogeneity value indicating the local homogeneity of source pixels of the source image in a block 1904; forming a watershed image by segmenting the homogeneity image, the watershed image having watershed segments with a segment weight in a block 1906; merging one of the watershed segments with another of the watershed segments with both of the watershed segments having the segment weight less than or equal to a segment threshold in a block 1908; forming a segmentation contour map having the boundaries of the watershed segments formed by merging the watershed segments in a block 1910; and forming a composite image with the segmentation contour map overlaying the source image for display on a device in a block 1912.

It has been discovered that the present invention thus has numerous aspects. The present invention valuably supports and services the historical trend of reducing costs, simplifying systems, and increasing performance. These and other valuable aspects of the present invention consequently further the state of the technology to at least the next level.

Thus, it has been discovered that the image processing system of the present invention furnishes important and heretofore unknown and unavailable solutions, capabilities, and functional aspects for efficiently auto-segmenting images. The resulting processes and configurations are straightforward, cost-effective, uncomplicated, highly versatile and effective, can be surprisingly and unobviously implemented by adapting known technologies, and are thus readily suited for efficiently and economically manufacturing image processing devices fully compatible with conventional manufacturing processes and technologies. The resulting processes and configurations are straightforward, cost-effective, uncomplicated, highly versatile, accurate, sensitive, and effective, and can be implemented by adapting known components for ready, efficient, and economical manufacturing, application, and utilization.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of an image processing system comprising:
   receiving a source image having source pixels;
   forming a homogeneity image having homogeneity pixels each with a homogeneity value indicating the local homogeneity of source pixels of the source image;
   forming a watershed image by segmenting the homogeneity image, the watershed image having watershed segments with a segment weight;
   merging one of the watershed segments with another of the watershed segments with both of the watershed segments having the segment weight less than or equal to a segment threshold;
   forming a segmentation contour map having the boundaries of the watershed segments formed by merging the watershed segments; and
   forming a composite image with the segmentation contour map overlaying the source image for display on a device.

2. The method as claimed in claim 1 further comprising:
   calculating target vectors having a target vector magnitude, the target vectors extending from a target pixel to each of the source pixels in a local window; and
   calculating a homogeneity vector having the homogeneity value set to the norm of the sum of the target vector magnitude of all of the target vectors.

3. The method as claimed in claim 1 wherein forming the watershed image includes calculating the segment weight for one of the watershed segments based on the value of the homogeneity value along a watershed contour angle.

4. The method as claimed in claim 1 wherein forming the watershed image includes merging two of the watershed segments directly connected to one another and the watershed segments having the segment weight less than or equal to the segment threshold.

5. The method as claimed in claim 1 wherein forming the segmentation contour map includes forming the straight line segments by approximating the watershed segments as straight line segments parallel to a watershed contour angle.

6. A method of operation of an image processing system comprising:
   receiving a source image having source pixels;
   forming a homogeneity image having homogeneity pixels each with a homogeneity value, the homogeneity value is the magnitude of the sum of a set of target vectors extending from a target pixel to the source pixels of a local window;
   forming a watershed image by segmenting the homogeneity image, the watershed image having watershed segments with a segment weight;
   merging one of the watershed segments with another of the watershed segments with both of the watershed segments having the segment weight less than or equal to a segment threshold;
   forming a segmentation contour map having the boundaries of the watershed segments formed by merging the watershed segments; and
   forming a composite image with the segmentation contour map overlaying the source image for display on a device.

7. The method as claimed in claim 6 wherein forming the homogeneity image includes:
   calculating the target vectors having a target vector direction and a target vector magnitude, the target vectors extending from the target pixel to each of the source pixels in the local window;
   calculating a homogeneity vector having the homogeneity value set to the magnitude of the sum of the target vector magnitude of all of the target vectors; and
   calculating a homogeneity direction as the sum of the target vector direction for all of the target vectors.

8. The method as claimed in claim 6 wherein forming the watershed image includes calculating the segment weight for one of the watershed segments based on the value of the homogeneity value along a watershed contour angle.

9. The method as claimed in claim 6 wherein forming the watershed image includes merging two of the watershed segments directly connected to one another and the watershed segments having the segment weight less than or equal to a segment threshold.

10. The method as claimed in claim 6 wherein forming the segmentation contour map includes forming the straight line segments by merging the watershed segments as straight line segments.

* * * * *